(12) United States Patent
Balandin

(10) Patent No.: US 7,917,471 B2
(45) Date of Patent: Mar. 29, 2011

(54) METHOD FOR OBTAINING INFORMATION OBJECTS IN A COMMUNICATION SYSTEM

(75) Inventor: Sergey Balandin, Helsinki (FI)

(73) Assignee: Nokia Corporation, Espoo (FI)

( * ) Notice: Subject to any disclaimer, the term of this patent is extended or adjusted under 35 U.S.C. 154(b) by 1129 days.

(21) Appl. No.: 11/546,390

(22) Filed: Oct. 12, 2006

(65) Prior Publication Data

US 2008/0016240 A1    Jan. 17, 2008

(30) Foreign Application Priority Data

Jul. 14, 2006   (EP) .................................... 06396013

(51) Int. Cl.
*G06F 7/00* (2006.01)
*G06F 17/00* (2006.01)
(52) U.S. Cl. ....................................................... 707/621
(58) Field of Classification Search .................. 707/621, 707/999.003
See application file for complete search history.

(56) References Cited

U.S. PATENT DOCUMENTS

| | | | |
|---|---|---|---|
| 2003/0028585 A1* | 2/2003 | Yeager et al. ................. | 709/201 |
| 2003/0182270 A1 | 9/2003 | Kuno et al. | |
| 2004/0243672 A1* | 12/2004 | Markki et al. ................ | 709/204 |
| 2005/0185624 A1 | 8/2005 | Anderson et al. | |
| 2005/0203851 A1* | 9/2005 | King et al. ...................... | 705/51 |
| 2006/0031386 A1 | 2/2006 | Burbeck | |
| 2006/0080286 A1* | 4/2006 | Svendsen ......................... | 707/3 |

FOREIGN PATENT DOCUMENTS

WO    WO 2006/068365 A1    6/2006

OTHER PUBLICATIONS

Bram Cohen, "Incentives Build Robustness in Bit Torrent", May 22, 2003, pp. 1-5.
Peter Maymounkov, et al., "Kademlia: A Peer-to-peer Information System Based on the XOR Metric", Mar. 7-8, 2002, pp. 1-6.
Aberer, Karl et al., "P-Grid: A Self-Organizing Structured P2P System", SIGMON Record, vol. 32, No. 3, Sep. 3, 2003, pp. 29-33.
"Search Engines", Web page, Dec. 5, 1998, (online), retrieved from Internet http://web.archive.org/web/199812051628258/http://volweb.utk.edu/STAFF/TELTRAIN/sengin.html whole document, pp. 1-5.

(Continued)

*Primary Examiner* — John R. Cottingham
*Assistant Examiner* — Nicholas E Allen
(74) *Attorney, Agent, or Firm* — Alston & Bird LLP

(57) ABSTRACT

The invention relates to a method for obtaining content objects in a communication system. In the method is obtained at least one search criterion at a first node. At least one entity entry is determined from an entity contact information list. An identity of a second network node is determined from the entity entry. An address is determined for the second network node using the identity. A search is submitted to the second network node. The search criteria are matched to a number of metadata objects to obtain result metadata objects, from which is provided at least a content object identifier to the first network node. The first network node obtaining a content object using said content object identifier from a third network node to the first network node.

24 Claims, 11 Drawing Sheets

OTHER PUBLICATIONS

Gupta, M., Judge, P., Mostafa, A. *A Reputation System for Peer-to-Peer Networks*. Proceedings of the 13th international workshop on Network and operating systems support for digital audio and video table of contents, ISBN 1-58113-694-3, chapters 1 and 4, Jun. 1-3, 2003, pp. 144-152.

Mischke, J., Stiller, B., "*Peer-to-Peer and Distributed Search in Fixed Mobile Environments*". System Sciences, 2004. ISBN 0-7695-2056-1, abstract, Proceedings of the 37th Annual Hawaii International Conference on Jan. 5-8, 2004, pp. 1-10.

Klemm, A., et al., "*A Special-Purpose Peer-to-Peer File Sharing System for Mobile Ad Hoc Networks*". VTC 2003-Fall. 2003 IEEE 58th. Vehicular Technology Conference Proceedings. Orlando, FL, Oct. 6-9, 2003, IEEE Vehicular Technolgy Conference, pp. 2758-2763, ISBN 0-7803-7954-3, abstract.

International Search Report PCT/FI2007/050418 filed Jul. 6, 2007.

\* cited by examiner

METHOD FOR OBTAINING INFORMATION OBJECTS IN A COMMUNICATION SYSTEM

BACKGROUND OF THE INVENTION

1. Field of the Invention

The invention relates to the data communications networks and the sharing of information objects between communicating entities. Particularly, the invention relates to a method for the obtaining information objects in a communication system.

2. Description of the Related Art

In World Wide Web (WWW) the obtaining and providing of content items is centralized to a server node from which browsing clients retrieve them. The server node must have sufficient processing and storage capacity to serve content requests. The server must have also sufficient bandwidth at its disposal to be able to provide the content items to the browsing client nodes. Thus, the server may introduce a bottleneck to the system. In order to facilitate content sharing peer-to-peer networks are emerging. In peer-to-peer networks the content providing burden is distributed to a number of file sharing nodes. Either a file system is distributed among the file sharing nodes so that different files are located in different machines. It is also possible to distribute parts of single files to different content sharing nodes in order to speed-up the downloading process.

Reference is now made to FIG. 1, which is a block diagram that illustrates content sharing in a communication system in prior art. In FIG. 1 there is an IP network. The IP network comprises three domains, namely domains 160, 162 and 164. In domain 160 there is a server 150. In domain 162 there are three clients, namely client 154, client 156 and client 158. Clients 154 and 158 are illustrated as laptop computers and client 156 is illustrated as a desktop computer. In domain 164 there is a client 152, which is illustrated as a wireless computer, for example, a mobile station. It should be noted that the illustration of the clients as laptop computers, desktop computers or wireless computers is purely for illustration purposes. Server 150 is serving a WWW-site which provides a content item, in other words, a content object (not shown), which is downloaded by the clients. The content item may be a file of any possible type, for example, a picture, a video or an audio recording. The mode of operation for content distribution in the World Wide Web is illustrated in FIG. 1. In this mode of operation each of the clients downloads the content item separately. Each of the clients has a separate dialog with server 150. In FIG. 1, client 152 first issues an HTTP request message to server 150 and is provided with a 200 OK message that comprises the content item. The interaction is illustrated with arrows 101 and 102. The obtaining of the content items to clients 154, 156 and 158 similarly is illustrated with arrows 103 and 104, 105 and 106, 107 and 108, respectively. The problem with this mode of operation is that server 150 constitutes a single point of failure in the network and the bandwidth available to server 150 is a bottleneck in the system. In order to deal with the disadvantages of a system of this kind new peer-to-peer technologies have been developed. The hosting and the transmission of a given content object is no longer the duty of a single server node. In peer-to-peer networks there are no longer just centralized servers, which are in the charge of providing and storing content items for clients.

Reference is now made to FIG. 2 which is a block diagram that illustrates content sharing in a peer-to-peer network in prior art. In FIG. 2 peer-to-peer network operates logically on top of six IP networks, in other words, domains. Peer-to-peer network comprises domains 220, 230, 240, 250, 260 and 270. The domains are, for example, sub-networks implemented with various different technologies such as local area networks or wireless local area networks, Asynchronous Transfer Mode (ATM) networks or Point-to-Point Protocol (PPP) networks. Functional entities that participate in file sharing are referred to as peers. In FIG. 2 peers are implemented in separate network nodes. In domain 220 there are nodes 222, 224 and 226. In domain 230 there is a node 232. In domain 250 there is a node 252. In domain 260 there is a node 262. Finally, in domain 270 there is a node 272. The internal functions within node 272 are illustrated with box 273. Node 252 acts as a web server. The downloading may be performed, for example, using the BitTorrent protocol defined in "Incentives Built Robustness in BitTorrent", B. Cohen, In First Workshop on Economics of Peer-to-Peer Systems, pages 251-260, Berkeley, Calif., USA, 2003. Node 272 is a tracker. A tracker provides information on all the nodes that participate in the downloading of a given content item. By providing the information on the nodes that participate in the downloading it is possible to ensure that different nodes download different parts of the content item. Thereby, the burden of providing the content item is shared between several nodes. In BitTorrent the nodes download first the part of the content item that occurs rarest among the other nodes that are downloading the same content item.

In FIG. 2 the starting point is that node 232 has downloaded content item C1 from node 262, as illustrated with arrow 201. Node 232 holds a complete copy C1' of content item C1. Thereupon, a user on node 224 downloads a torrent file from node 252 as illustrated with arrow 202. The torrent file provides a reference to node 272, which acts as a tracker for the torrent. A torrent file has the file name extension ".torrent". Node 224 obtains from node 272 information on the nodes that participate in the downloading process so that they are able to provide pieces of content item C1, as illustrated with arrow 203. At time $T_2$, when the information request from node 224 arrives, the nodes thus far informed to node 224 include only nodes P2 and P4, that is, nodes 262 and 232. Earlier, at time $T_1$, the request from node 232 resulted only to the information on node P2 since it was the only node holding a copy C1' of content item C1. In response to information on nodes P2 and P4, node 224 starts downloading different portions belonging to content item C1 from nodes 232 and 262, as illustrated with arrows 204A and 204B. Later, node 226 also obtains (not shown) the torrent file pertaining to content item C1 from node 252 and contacts (not shown) tracker 272. At time $T_3$, in response, node 226 obtains information on nodes P2, P4 and P5 from tracker 272. It is now possible for node 226 to obtain pieces of content item C1 from nodes 224, 262 and 232, that is, nodes P5, P2 and P4, in order to speed up the downloading process. The obtaining of pieces of content item C1 is illustrated with arrows 205A, 205B and 205C. The nodes that participate in the downloading and sharing process are also referred to as a swarm in BitTorrent.

Reference is now made to FIG. 3, which is a block diagram that illustrates a distributed hash table in prior art. The concept of a distributed has table is defined, for example, in "Kademlia: Peer-to-peer Information System Based on the XOR Metric", P. Maymounkov, D. Mazieres, Electronic Proceedings for the $1^{ST}$ International Workshop on Peer-to-peer Systems, 7-8 Mar. 2002—MIT Faculty Club, Cambridge, Mass., USA.

Distributed Hash Table (DHT) 360 is stored on a number of nodes such as nodes 361, 362, 363, 364, 365, 367, 368 and 369. In FIG. 3 there is illustrated a circle 370, which represents the key space of distributed hash table 360. In FIG. 3 the key space size is 228 bits. In order to store value in distributed hash table 360, a key is computed of the value. The key is a number in the 128 bits key space.

Each node participating in the distributed hash table is assigned a key which is referred to as the identifier of the node. A range of keys around that identifier are assigned to the node. All values that have a hash key which falls within the key range of a given node are stored to that node. In order to provide robustness, a number of different nodes maybe assigned to be in charge of the same key space range. For example, there maybe two nodes which are in charge of a given key space range and are able to route a query carrying a hash key to the right node. Each node must store some information on other nodes that participate in the distributed hash table. The information on other nodes maybe arranged as a cache. The density of hash keys and corresponding IP addresses in the cache of a node is inversely proportional to the distance of the keys from the key of that node. The cache is arranged to have a number of levels. The densities of the hash keys with a stored IP address are dependent on the level. The highest level represents the entire key space. The lowest level represents the immediate neighbors of the node in terms of the key space assigned to them. In Figure there are three levels. The highest level is key range 370. The middle level is represented by arc 372. The lowest level is represented by arc 374.

In FIG. 3 there is illustrated how the IP address of a node hosting a given file maybe discovered using distributed hash table 360. At time $T_0$, a first hash key is computed using the file content itself. The node closest to the first hash key shall store the IP address for the node holding the file. In this case the node to hold the key is node 367. Thereupon at time $T_1$, a second hash key is computed using the name of the file or alternatively a keyword for the file. The second hash key is closest to hash key 366 associated with node 368. Therefore, the first hash key is stored in node 368.

At time $T_2$ node 364 wishes to obtain the address of the node that currently stores the file mentioned above. Therefore, node 364 computes the second hash key using the file name. Using the second key node 364 determines from its cache the node which is closest to the second hash key in terms of key space and the hash key values assigned to the node. Therefore, node 364 determines node 361 and sends the second hash key to node 361 as illustrated with arrow 301. Node 361 determines using the second hash key again a node that in its cache is closest to the second hash key. Node 361 determines node 362 as the closest node and sends the query to it as illustrated with arrow 302. Thereupon, node 362 determines node 363 and sends the query to it, as illustrated with arrow 303. Node 363 determines node 365 and send the query to it, as illustrated with arrow 304. Finally, node 365 determines that node 368 in its neighbor cache and is in charge of the key range comprising the second hash key. Therefore, node 365 sends the query to node 368, as illustrated with arrow 305. By knowing the IP address of node 364 from the query, node 368 is capable to send the first hash key directly to node 364.

Thus, node 364 is capable of starting the distributed hash table traversal process again to obtain the address of node 367 currently hosting the file. This time the traversal process uses the first hash key. Node 364 may also obtain directly the IP address of node 367 from node 368, if it is guaranteed that node 367 will be up and able to serve the query.

SUMMARY OF THE INVENTION

The invention relates to a method for obtaining content objects in a communication system comprising at least a first network node and a second network node. The method comprises: obtaining at least one search criterion in said first network node; determining at least one entity entry from an entity contact information list; determining an identity of said second network node from said entity entry; determining an address for said second network node using said identity; submitting said at least one search criterion to said second network node; matching said at least one search criterion to at least one metadata object to obtain at least one result metadata object in said second network node; providing at least a content object identifier from said at least one result metadata object to said first network node; and obtaining a content object using said content object identifier to said first network node.

The invention relates also to a method for providing content objects in a communication system comprising at least a mobile node, first network node and a second network node. The method comprises: obtaining a content object and a metadata object pertaining to said content object in said mobile node; determining at least one associated metadata object for said metadata object; uploading said content object from said mobile node to said second network node; uploading said metadata object from said mobile node to said second network node; receiving a query from said first network node; determining said metadata object as a result metadata object for said query in said second network node; providing at least a content object identifier for said content object from said metadata object to said first network node; and downloading or accessing said content object using said content object identifier to said first network node.

The invention relates also to a communication system comprising: a first network node configured to obtain at least one search criterion, to determine at least one entity entry from an entity contact information list, to obtain an identity of a second network node from said entity entry, to obtain an address for said second network node using said identity, to submit said at least one search criterion to said second network node, to obtain at least a content object identifier and to obtain or access a content object with said content object identifier; and said second network node configured to match said at least one search criterion to at least one metadata object to obtain at least one result metadata object and to provide at least a content object identifier from said at least one result metadata object to said first network node.

The invention relates also to a communication system comprising: a mobile node configured to obtain a content object and a metadata object pertaining to said content object, to determine at least one associated metadata object for said metadata object, to upload said content object to a second network node, to upload said metadata object to said second network node; said second network node configured to receive a query from a first network node, to determine said metadata object as a result metadata object for said query, to provide at least a content object identifier for said content object from said metadata object to said first network node; and said first network node configured to download or access said content object using said content object identifier.

The invention relates also to a network node comprising: a database entity configured to obtain at least one search criterion, to determine at least one entity entry from an entity contact information list, to obtain an identity of a second network node from said entity entry; and a communication entity configured to obtain an address for said second network node using said identity, to transmit said at least one search criterion to a said second network node, to obtain at least a content object identifier and to obtain or access a content object with said content object identifier from a remote network node.

The invention relates also to a network node comprising: means for obtaining at least one search criterion, to determining at least one entity entry from an entity contact information list, obtaining an identity of a second network node from said entity entry; and means for obtaining an address for said second network node using said identity, transmitting said at least one search criterion to a said second network node, obtaining at least a content object identifier and obtaining a content object with said content object identifier from a remote network node.

The invention relates also to a network node comprising: a memory configured to store at least one metadata object and at least one content object; and a processor configured to process a query from a remote network node, to determine a first metadata object among said at least one metadata object as a result metadata object for said query, to provide at least a content object identifier for a first content object among said at least one content object from said first metadata object to said first network node.

The invention relates also to a network node comprising: means for storing at least one metadata object and at least one content object; and means for processing a query from a remote network node, determining a first metadata object among said at least one metadata object as a result metadata object for said query, providing at least a content object identifier for a first content object among said at least one content object from said first metadata object to said remote network node. The invention relates also to a computer program comprising code adapted to perform the following steps when executed on a data-processing system: obtaining at least one search criterion; determining at least one entity entry from an entity contact information list; obtaining an identity of a network node from said entity entry; obtaining an address for said network node using said identity; transmitting said at least one search criterion to a said network node; obtaining at least a content object identifier from said network node; and obtaining or accessing a content object with said content object identifier.

The invention relates also to a computer program comprising code adapted to perform the following steps when executed on a data-processing system: storing at least one metadata object and at least one content object; processing a query from a remote network node; determining a first metadata object among said at least one metadata object as a result metadata object for said query; and providing at least a content object identifier for a first content object among said at least one content object from said first metadata object to said remote network node.

In one embodiment of the invention, a database entity in the first network node obtains the content object to said first network node from a third network node.

In one embodiment of the invention, the matching step further comprises traversing a tree structure comprising said at least one metadata object. In one embodiment of the invention, the at least one metadata object may be stored in a knowledge database, which may be, for example, structured as a network or a tree structure or a set of relations. The at least one metadata object is linked using link to connect logically associated metadata objects together in tree or network structure. In one embodiment of the invention, the matching step further comprises the traversing of links connecting logically associated metadata objects in a metadata object database, in other words, a knowledge database.

In one embodiment of the invention, the knowledge database is stored, for example, in the memory of the second network node, the third network node and the mobile node. The memory may be a Random Access Memory (RAM) or a secondary memory comprising, for example, a hard disk, flash memory, optical memory or any nonvolatile memory.

In one embodiment of the invention, the database entity in the first network node checks a predefined entity specific trust level before it submits said at least one search criterion to said second network node. The database entity in the first network node selects a second entity entry from said entity contact information list, if said trust level is below a predefined threshold value. In other, words, entity entries with trust levels above the predefined threshold value are selected. A similar check may be performed in a database entity in another network node, if the network node has received the at least one search criterion and is thus processing a query from the first network node. The database entity may have a database that is tree structured. The database may be a knowledge database with logical links connecting knowledge objects.

In one embodiment of the invention, the trust levels are defined so that the most trusted level is zero whereas the least trusted is one. Therefore, the entity entries above a predefined threshold are passed in this embodiment of the invention.

In one embodiment of the invention, the database entity in the first network node may also be a database client, which is only used for allowing a user to input query expressions specifying at least one search criterion. These queries are then submitted to an actual database entity in the second network node.

In one embodiment of the invention the knowledge database, in other words, a database entity may be defined as a structured document, for example, in extensible mark-up language (XML) format.

In one embodiment of the invention, the database entity in the second node or any node processing a query provides said at least one result metadata object and at least one metadata object on the path towards said at least one result metadata object to the first network node. This may be performed in any of the above mentioned embodiments.

In one embodiment of the invention, the database entity in the second node or any node processing a query determines at least one direct reference associated with a metadata object. The direct reference identifies a fourth node. The at least one search criterion is submitted to the fourth node as a query. A database entity in the fourth network node matches the at least one search criterion to at least one metadata object to obtain at least one result metadata object. The database entity provides at least a content object identifier from said at least one result metadata object to said first network node in response to the query. The response to the query may be submitted via the node that sent the query to the fourth network node. The direct references may be used in any of the above mentioned embodiments.

In one embodiment of the invention, an entity in the entity contact information list is at least one of a natural person and a legal person.

In one embodiment of the invention, the communication entity or a peer-to-peer entity in the first network node or a network node from which the content object is to be downloaded or accessed determines at least one sharing node for said content object. Thereupon, at least a second part of said content object is loaded to the at least one sharing node. The loading may be coordinated in the peer-to-peer entity. Thereupon, it is possible for the first network node to download or access at least a first part of said content object from said second network node and to download or access at least a second part of said content object to said first network node from said at least one sharing node. The peer-to-peer entity may use a peer-to-peer protocol to perform the downloading or accessing. Sharing nodes may be used by the first network node, the second network node, the third network node or the mobile node in downloading or accessing content objects. The downloading or accessing may occur over a wireless or a wired connection.

In one embodiment of the invention, the determining an address for said second network node using said identity comprises the use of a distributed hash table. The first node computes a hash key for said identity and determines next network node for to which a query for obtaining the address of the second network node must be sent. The query comprises the computed hash key. A distributed hash table may be used in any of the embodiments above.

In one embodiment of the invention, the communication system comprises an IP multimedia subsystem.

In one embodiment of the invention, the communication system comprises a packet switched network, for example, an Internet Protocol (IP) network.

In one embodiment of the invention, said communication system comprises a mobile communication network. In one embodiment of the invention, said terminal comprises a mobile station or generally a mobile terminal. In one embodiment of the invention, the communication system comprises at least one of a Global System of Mobile Communications (GSM) network, a Universal Mobile Telephone System (UMTS) network, a CDMA2000 network, a PCM network, a network according to IEEE 802 standards or a WiMAX network. The terminal may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, optical disk, magnetic tape, holographic memory or other medium known to persons skilled in the art.

The benefits of the invention are related to improved performance and increased reliability in a communication system. A user community that wishes to share mutually content does not have the option of using a centralized Internet search engine. If the information is confidential, the use of a public search engine is not possible. On the other hand, the offering of a private search engine in the community is an administrative burden and introduces a single point of failure. The offering of a search engine by a single user for the whole community places an undue burden on the user. Further, in current peer-to-peer networks there is no way of searching different content items. Therefore, it would be beneficial to be able to distribute to different users in the community information for describing the content shared.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
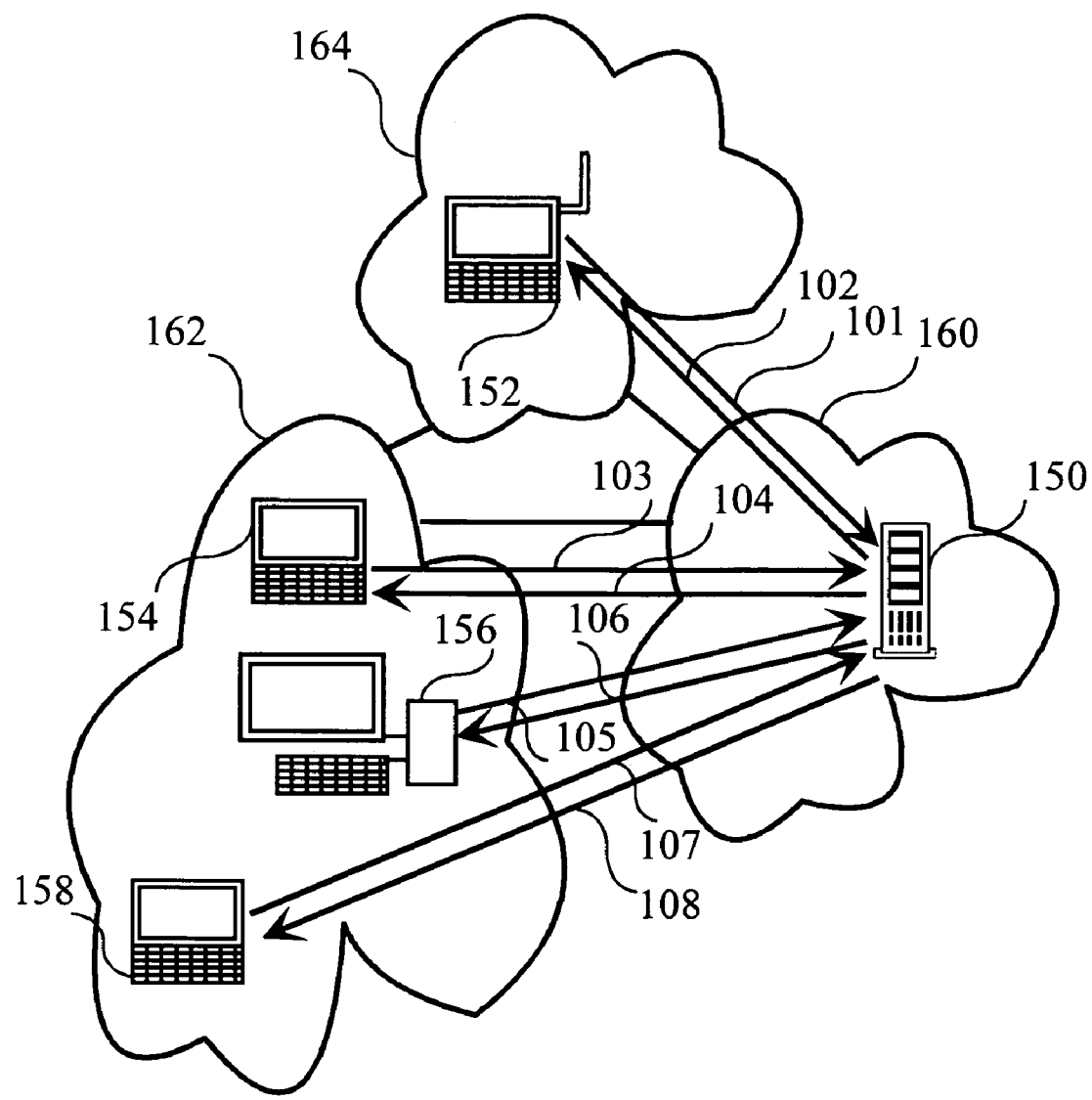
FIG. 1 is a block diagram illustrating content sharing in a communication system in prior art.
Figure 2:
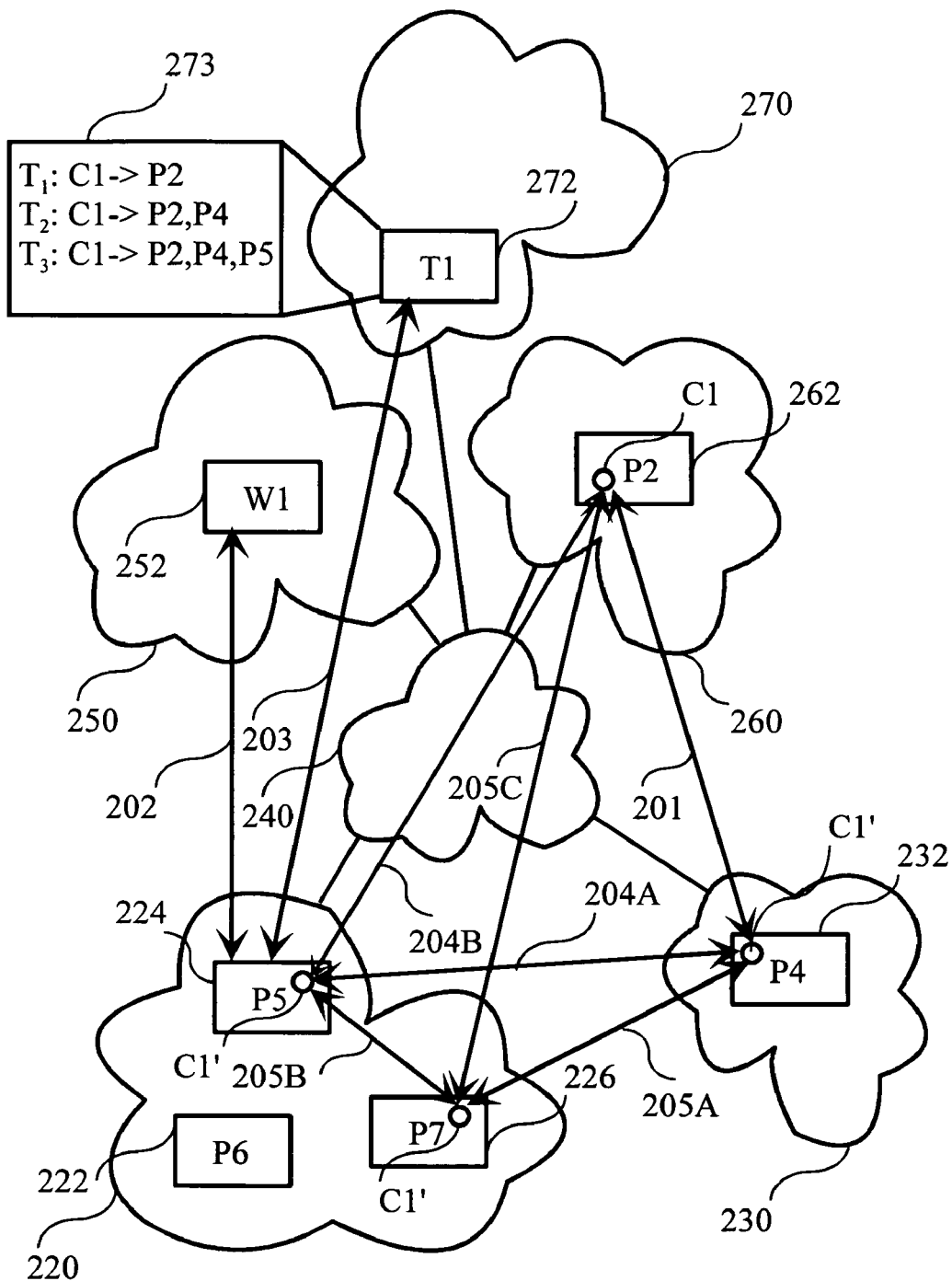
FIG. 2 is a block diagram which illustrates content sharing in a peer-to-peer network in prior art.
Figure 3:
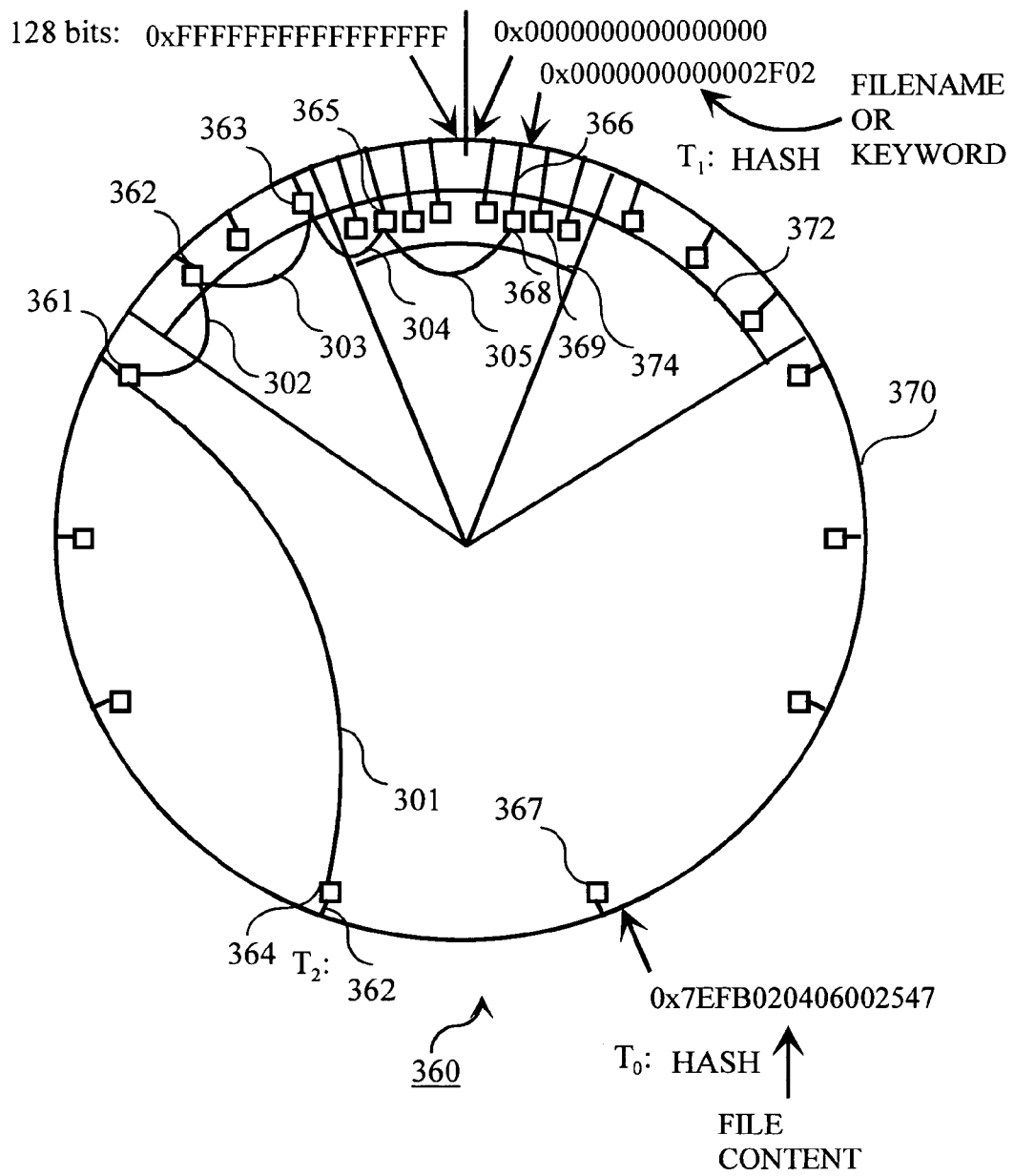
FIG. 3 is a block diagram which illustrates a distributed hash table in prior art.
Figure 4:
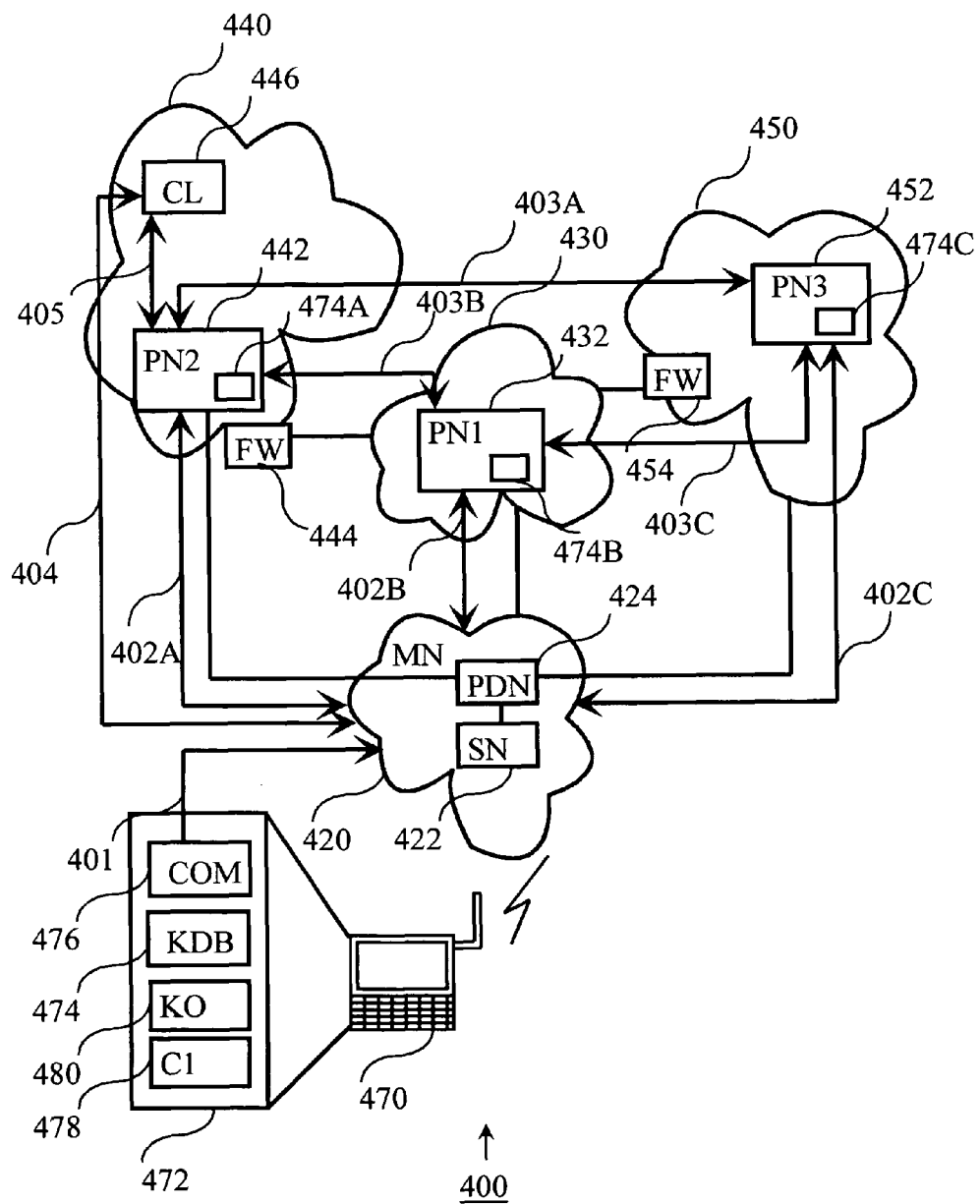
FIG. 4 is a block diagram illustrating content and metadata sharing in one embodiment of the invention.

FIG. 4 is a block diagram illustrating content and metadata sharing in one embodiment of the invention. In FIG. 4 there is a mobile communication system 400. Mobile communication system 400 comprises a mobile network 420 and three domains namely domains 430, 440 and 450. There is also a mobile node 470. The internal functions of mobile node 470 are illustrated with box 472. Domain 450 comprises a peer node 452 and a firewall 454. Domain 430 comprises a peer node 432. Domain 440 comprises a peer node 442 and a remote client node 446. In domain 440 there is also a firewall 444. Mobile network 420 comprises a serving node 422 and a packet data node 424. Serving node 422 is, for example, a Serving GPRS Support Node (SGSN). Packet data node 424 is, for example, a Gateway GPRS Support Node (GGSN). Support node 422 handles all mobility related tasks. Packet data node 424 offers an access point to at least one external network. An access point may comprise, for example, an IP address. Mobile node 470 comprises a peer-to-peer entity 476. Peer-to-peer entity 476 comprises, for example, at least one peer-to-peer protocol implementation for communicating with other peer-to-peer nodes. Mobile node 470 comprises also a knowledge database 474. The knowledge database 474 is, for example, a structured metadata database. The database may be structured, for example, as a tree, a network or a set of relations. The metadata may be represented, for example, using extensible markup language (XML).

Initially, it is assumed that mobile node 470 holds a content object 478 and an associated knowledge object 480. Thereupon, mobile node starts uploading the content object 478 and knowledge object 480 to mobile network, as illustrated with arrow 401. Content object 478 and knowledge object 480 are uploaded to peer nodes 442, 432 and 452, as illustrated with arrows 402A, 402B and 402C, respectively. Peer nodes 442, 432 and 452 store mirror copies 474A, 474B and 474C of knowledge base 474. In case mobile node 470 has not determined the placing of the knowledge object 480 in knowledge database 474, this determination is left to the peer nodes and it is performed only after the uploading is complete. The matching of knowledge object 480 to knowledge database 474 may also be performed in mobile node 470 and it produces a reference such as a pointer or a path which directly reveals the place for knowledge object 480 in knowledge database 474.

For example, the determination entails that knowledge object 480 is matched against each knowledge object in knowledge database 474. The matching is, for example, based on keywords so that the knowledge object 480 is associated with a knowledge object which has most matching keywords. The matching process may also utilize a thesaurus accessed from the Internet which determines the conceptual relationship of the keywords. The determination may also utilize an external data structure which determines the logical relationships of concepts, for example, as a semantic network or a hierarchy. The determination may utilize, for example, the semantic web. The relationship of knowledge object 480 with existing knowledge objects may also be determined manually by the user of mobile station 470 before the knowledge object 480 is uploaded to the peer nodes. In one embodiment of the invention knowledge object 480 is uploaded, for example, to peer node 442 and mirror copies 474B, 474C of knowledge database 474 are left unsynchronized. Therefore, the peer nodes which store mirror copies of knowledge database 474 must synchronize their copies with mirror copy 474A. The mutual synchronization of peer nodes 442, 432 and 452 is illustrated with arrows 403A, 403B and 403C. It is also possible that only certain predefined portions of knowledge database are stored in a given peer node. For example peer node 452 may store all work related knowledge information for the user while peer node 442 stores all home related information in the knowledge database. The publicly accessible information may be stored in peer node 432. A knowledge database may be distributed, for example, so that different sub-trees of the knowledge database are assigned to different peer nodes.

At a given point in time after the synchronization, remote client node 446 attempts to send a query message to knowledge database 474 in mobile node 470. Due to the fact that mobile node 470 is not able to process the query a negative response is provided to remote client node 446 from mobile network 420. The negative response may also originate from mobile node 470. The query and the negative response are illustrated with arrow 404. In response to the negative response, remote client node sends the query to mirrored knowledge database 474A. The enquiry of mirrored knowledge database 474A in peer node 442 from remote client node 446 is illustrated with arrow 405. The enquiry comprises a query and a response.

In one embodiment of the invention, remote client node 446 first attempts to establish connection to mobile node 470 in order to access the knowledge database of the user of mobile node 470. If mobile node 470 is not reachable or the bandwidth available for communicating with mobile node 470 is insufficient, remote client node 446 is redirected to at least one of mirror copies 474A, 474B and 474C. The redirection comprises, for example, that remote client node 446 is provided in response an alternative address or name that refers to one of mirror copies 474A, 474B and 474C when it sends a query message for original knowledge database 474 to mobile node 470. The query message may also be routed, for example, by a proxy node, which participates in the routing of database query messages to mobile nodes, to one of peer nodes 442, 432 and 452 whenever the proxy node determines that mobile node 470 is not reachable or does not have bandwidth to receive the query message or respond to it. In one embodiment of invention, query messages to mobile node 470 are first processed by a peer node, for example, peer node 432 that acts as a proxy for transmitting query messages and responses to/from mobile node 470.

In one embodiment of the invention, a name referring to knowledge database 474 is used in remote client node 446 to compute a hash key. Remote client node 446 uses the hash key to obtain from a distributed hash table the addresses or names of the network nodes that provide knowledge database 474 or one of its mirror copies 474A, 474B and 474C.

In one embodiment of the invention peer nodes 432, 442 and 452 act as file sharing nodes when a peer-to-peer protocol is used to obtain a content object from mobile node 470 or any other node that holds at least part of the content object. In other words, peer nodes 432, 442 and 452 may form, for example, a BitTorrent swarm in the downloading of a content object to remote client node 446. Mobile node 470 may participate to the swarm depending on its availability and available radio bandwidth.

In one embodiment of the invention, the user of mobile node 470 is provided with an alert message whenever a remote user issues a query that is targeted to knowledge base 474 or one of its mirror copies. The user of mobile node 470 may give permission to access his knowledge database or deny the access. The denial is obeyed by peer nodes 432, 442 and 452 when they receive a negative response from mobile node 470.

Figure 5A:
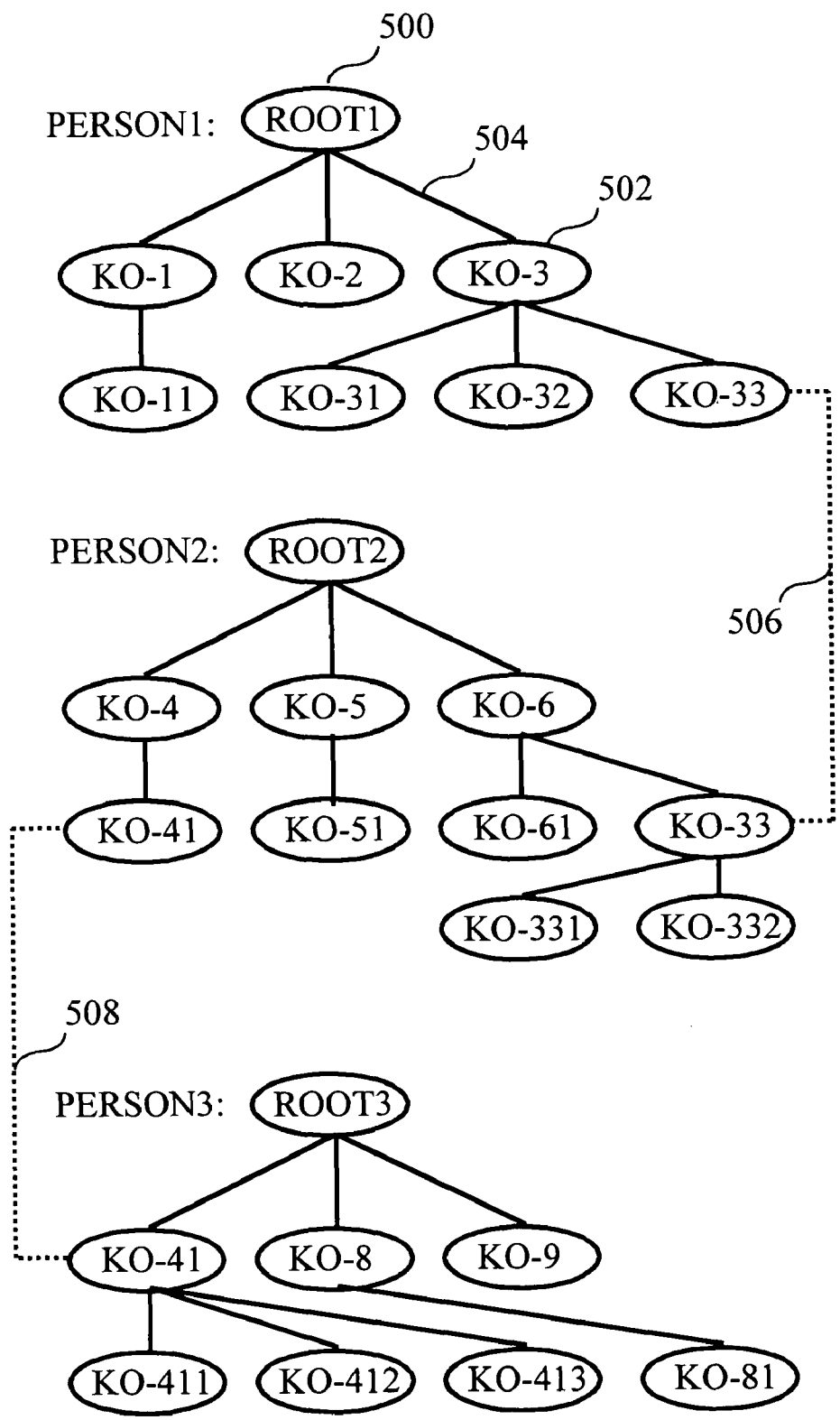
FIG. 5A is a block diagram illustrating a knowledge database in one embodiment of the invention.

FIG. 5A is a block diagram illustrating a knowledge database in one embodiment of the invention. In FIG. 5A there is illustrated the knowledge databases of three persons, namely PERSON1, PERSON2 and PERSON3. In a knowledge database there is a root node 500. There may also be knowledge objects such as knowledge object 502. Knowledge objects are associated with each other with links which may be unidirectional or bidirectional. In FIG. 5A root node 500 and knowledge object 502 are associated with link 504. The link is an address or a pointer. Between two knowledge databases there may be direct references such as illustrated with lines 506 and 508. Direct references associate part of another knowledge database to the referring knowledge database. From enquiry point of view the referred knowledge database becomes thus part of the referring knowledge database even though they are stored as separate knowledge databases. The knowledge databases in FIG. 5A may be stored on different nodes or on a single node. In FIG. 5A root node 500, in other words ROOT1 has three child nodes, namely KO-1, KO-2 and KO-3. KO-1 has one child KO-11. KO-3 has three children, namely KO-31, KO-32 and KO-33. KO-33 comprises a direct reference to the knowledge database of person PERSON2. In the knowledge database for person PERSON2 root node ROOT2 has three child knowledge objects, namely KO-4, KO-5 and KO-6. KO-4 has one child KO-41 and KO-5 has also one child KO-51. KO-6 has two children KO-61 and KO-33. KO-33 has two children KO-331 and KO332. The knowledge database for person PERSON3 comprises root node ROOT3 which has three children KO-41, KO-8 and KO-9. KO-41 has three children, namely KO-411, KO-412 and KO-413. KO-8 has one child KO-81. Each higher level knowledge object is associated with a certain topic and subordinate knowledge objects are subtopics relating to this topic. In one embodiment of the invention the knowledge database may be a network database or a relational database so that a given knowledge object may be subordinate to two or more knowledge objects. The knowledge objects may also form a network wherein there is one starting point node which replaces the root node. A tree structure may be navigated top down so that from the first level is found a best matching topic for a search term and thereafter the search continues in the next level by checking the child nodes for the selected knowledge object. Whenever a direct reference is encountered a query message is submitted to the node which comprises the referred knowledge database. The query is processed in the next node which received the query. In one embodiment of the invention the referred knowledge database is traversed only from the knowledge object to which the direct reference pointed.

Figure 5B:
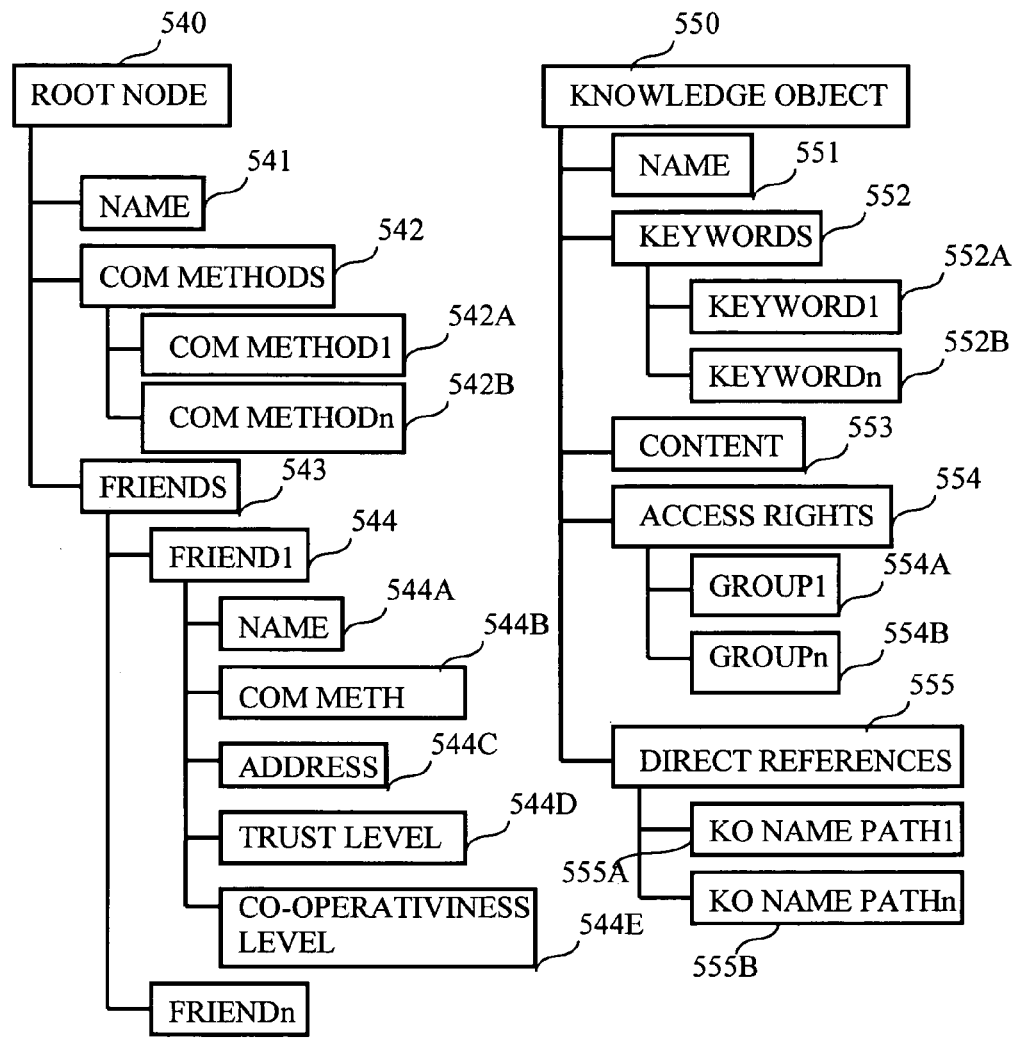
FIG. 5B is a block diagram illustrating a knowledge database root node and a knowledge object in one embodiment of the invention.

FIG. 5B is a block diagram illustrating a knowledge database root node and a knowledge object in one embodiment of the invention.

In FIG. 5B there is illustrated the structure of a root node 540. Root node 540 has associated with it a name element 541 which is, for example, a character string. The name may be the given name of a person to whom the knowledge database belongs. Root node 540 has associated with it a list of communication methods 542 which lists the communication methods for reaching the owner of the knowledge database. They may be any number of communication methods such as 542A and 542B. Such communication methods comprise for example IP multimedia, Plain Old Tele-phony Service (POTS), e-mail or instant messaging. Also different peer-to-peer protocols for sharing content associated with the knowledge objects in the knowledge database may be listed as communication methods 542. Root node 540 has associated with it a friends list 543 which may have at least one friend 544 associated with it. Associated with each friend 544 there is a name element 544A and at least one communication method 544B for communicating with that person or obtaining knowledge information from that person's knowledge database. There is an address element 544C, which identifies the address or the name of the node containing that person's knowledge database. The address element may also be accompanied with for example a port number. Associated with a friend there is also a trust level value 544D, which indicates how much that friend is trusted as a provider of information from his knowledge database. The trust level is for example from 0 to 1. There is also a cooperativeness level 544E.

In one embodiment of the invention address element 544C identifies the name of that person's knowledge database. The name or the address of the node containing the knowledge database is in turn determined, for example, from a distributed hash table using the name of that person's knowledge database as the argument to the hash function.

In FIG. 5B there is illustrated also a knowledge object 550 for a knowledge database, for example, as illustrated in FIG. 5A. Knowledge object 550 has associated with it a name 551 which is a character string. In addition to the name there is a list of keywords 552 which represent alternative names 552A and 552B for the knowledge object, for example, alternative terms for referring to the same subject. The keywords may be obtained from a thesaurus. The keyword list may also be amended as a result of query responses which have identified similar objects form other knowledge databases. Knowledge object has a reference 553 to the actual associated content object. The reference may be, for example, a Uniform Resource Locator (URL), a path name, a memory pointer or a database pointer. Knowledge object 550 has associated with it a list of access rights 554 for at least one group such as groups 554A and 554B. The groups are identified, for example, using character strings of numbers or other similar identifiers. Associated with knowledge object 550 there is a list of direct references 555 which may comprise at least one direct reference to another knowledge database. Direct references comprise a knowledge object name path for finding the correct knowledge object. There are illustrated knowledge object name paths 555A and 555B.

Figure 5C:
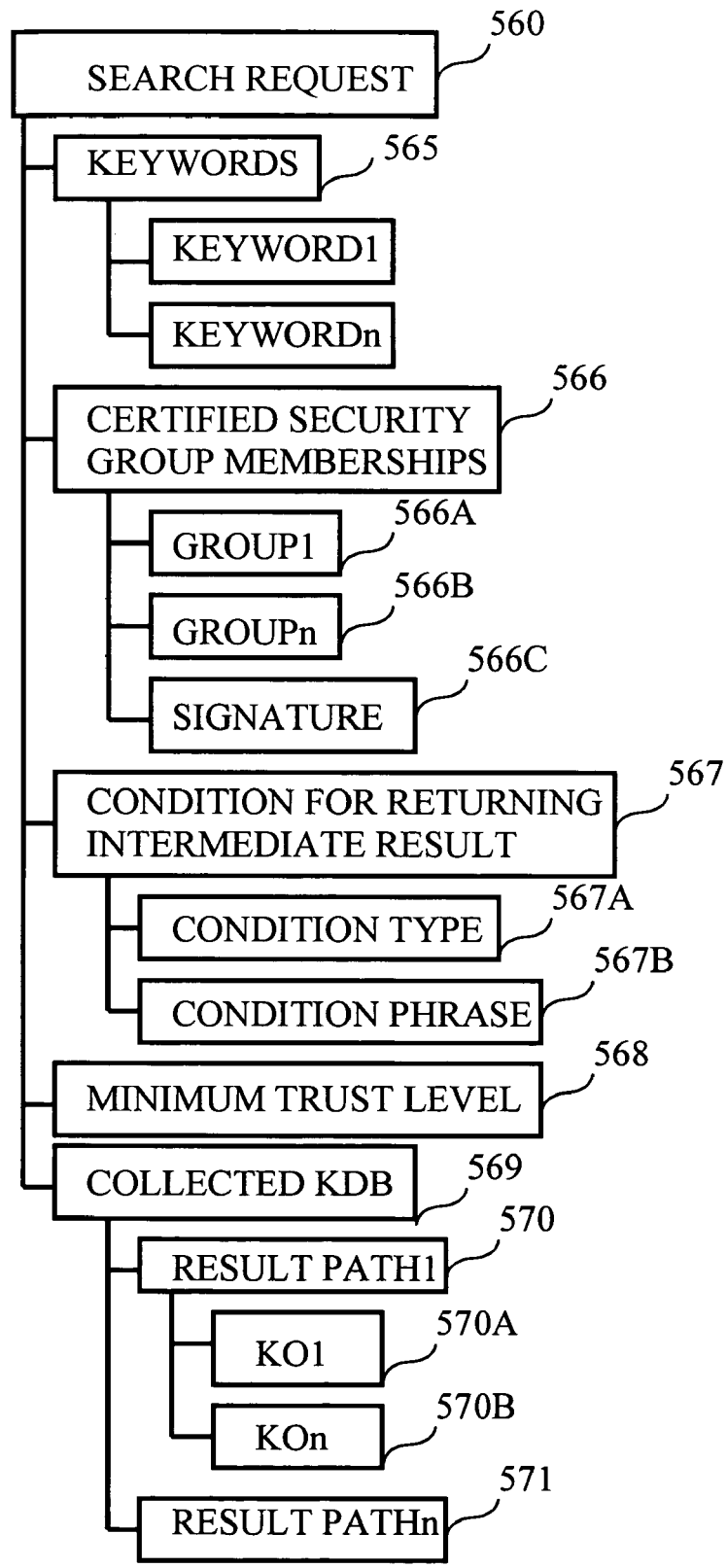
FIG. 5C is a block diagram illustrating a search request in one embodiment of the invention.

FIG. 5C is a block diagram illustrating a search request in one embodiment of the invention. In FIG. 5C there is illustrated a search request 560. Search request 560 may be structured as a markup language document. The search request comprises at least one keyword in a keyword list 565. The keywords such as 565A and 565B are, for example, character strings. Search request 560 comprises a list of certified security group memberships 566. There may be at least one group identifier such as group identifiers 566A and 566B. The list may also be signed by a digital signature 566C of an authority for granting group memberships. Group memberships may also be separately signed by an authority for that group. Associated with search request 560 there is a condition 567 for returning an intermediate result to the user. The condition is identified with a condition type 567A and a condition phrase 557B. Condition phrase 567B may be a Boolean expression and it may also comprise the comparing of pre-defined attributes to certain values. For example, the number of obtained results compared to a predefined minimum number of results. Associated with search request 568 there is a minimum trust level which identifies which knowledge databases should not be consulted. The user may assign different trust levels to the knowledge databases of different persons. Associated with search request 560 is also the knowledge database 569 collected during the query processing. The collected knowledge database may comprise at least one result path such as result paths 570 and 571. A result path comprises at least one knowledge object such as knowledge objects 570A and 570B.

In one embodiment of the invention, knowledge objects 570A and 570B in result path 570 comprise information on the name or address of the knowledge database or network node, which provided the knowledge objects. In one embodiment of the invention, an enquiring node may use this information to set-up direct references from its knowledge database to the knowledge database in the enquiring node.

Figure 6:
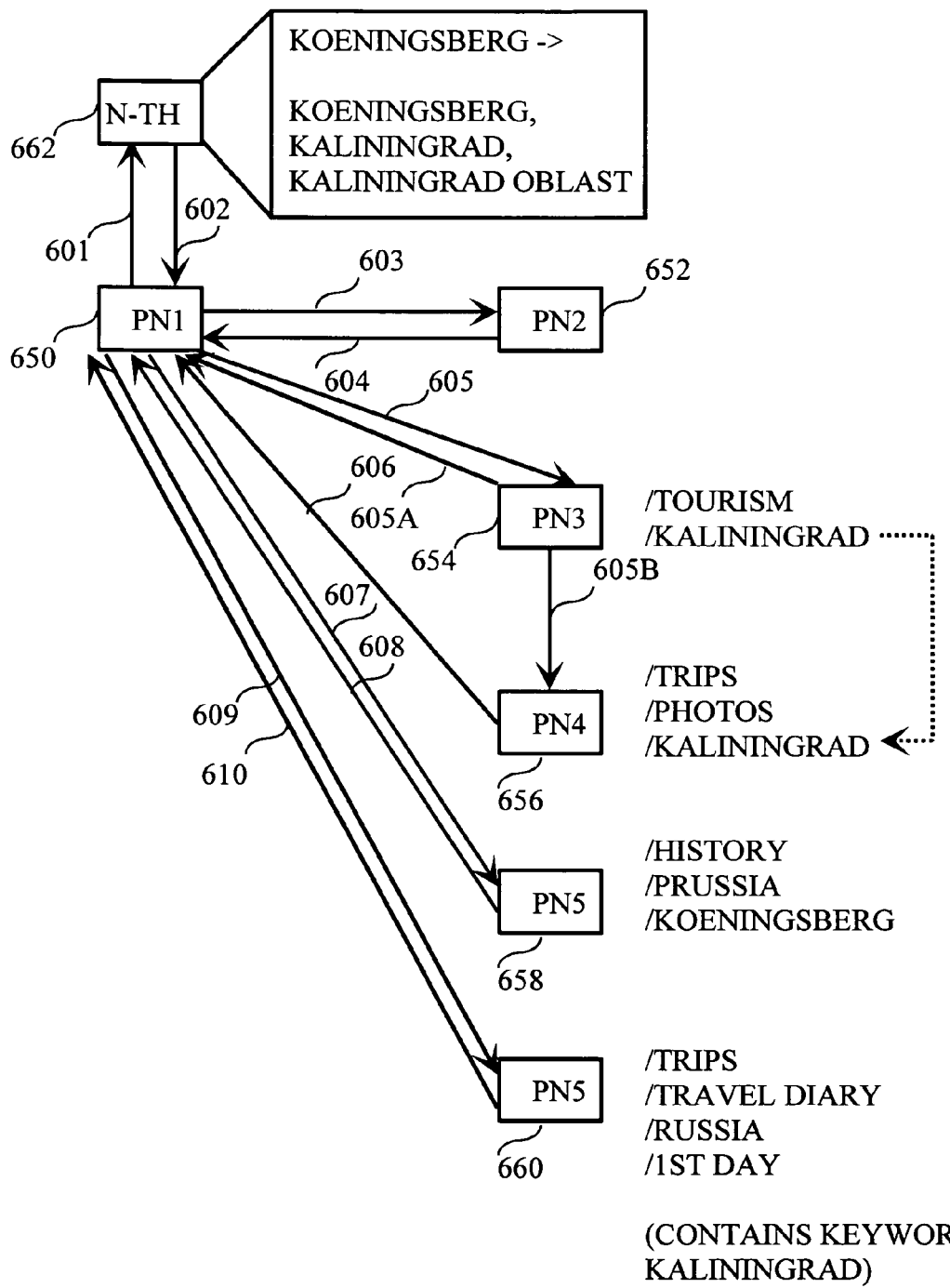
FIG. 6 is a block diagram illustrating the processing of a metadata query in a communication system in one embodiment of the invention.

FIG. 6 is a block diagram illustrating the processing of a metadata query in a communication system in one embodiment of the invention. In FIG. 6 there are six peer nodes, namely peer nodes 650, 652, 654, 656, 658 and 660. These peer nodes represent a community. The community is defined in a friends list of a user of peer node 650. There is also a node 662, which comprises a thesaurus. Each peer node holds a knowledge database. On the right side of peer nodes 654, 656, 658 and 660 are illustrated name paths leading to a knowledge object which is a match for a query submitted from peer node 650. The name paths are illustrated starting from a root node and leading to a matching knowledge object.

The starting point in FIG. 6 is that a user of peer node 650 submits a query relating to the city of Koeningsberg. The user in interested to obtain information on architecture in the city of Koeningsberg which was the capital of former Prussia. The query expression comprises only the string Koeningsberg. Initially the query expression is submitted to node 662 which expands the search term using a thesaurus to comprise also alternative expressions for the same term. Therefore string Koeningsberg is translated to a list of terms consisting of Koeningsberg, Kaliningrad and Kaliningrad Oblast. The amended query term list is returned to peer node 650, as illustrated with arrow 602. Using the friends list peer node 650 obtains the name or address for peer node 652. Name for peer node 652 is resolved into an IP address either using a distributed hash table or using the domain name system. The query is sent as illustrated with arrow 603. Peer node 652 searches its knowledge database using the search terms and determines that it does not have any matching knowledge objects. The empty response is returned to peer node 650, as illustrated with arrow 604.

Thereupon, peer node 650 obtains next friend from friends list and thus obtains address or name information on peer node 654. The name may be resolved possibly resolved in a distributed hash table or the domain name system. The query is submitted to peer node 654, as illustrated with arrow 605. Peer node 654 traverses its knowledge database using the search terms. The result is that a knowledge object named Kaliningrad is found in the knowledge database. The knowledge object contains a direct reference to a second knowledge object in peer node 656. Since the condition for returning intermediate result is set to value "1" and there is one result, the result is returned from peer node 654 to peer node 650, as illustrated with arrow 605A. The result comprises a result path, which further comprises knowledge objects "TOURISM" and "KALININGRAD". These knowledge objects comprise the direct reference information. Thereupon, peer node 654 also processes the direct references.

In order to process the direct reference peer node 654 submits the query to peer node 656 as illustrated with arrow 605B. Peer node 656 receives the query message and obtains the direct reference information from it. Peer node 656 obtains the referred object in its knowledge database. Since the condition for returning intermediate result is set to value "1" and there is one result, the result is returned to peer node 650, as illustrated with arrow 606. The result is embedded in the search request as the collected knowledge database and the result path contains the knowledge objects "TRIPS", "PHOTOS" and "KALININGRAD" from peer node 656 from the friends list. Thereupon, peer node 650 determines peer node 658 from the friends list. Therefore, peer node 650 submits the query to peer node 658, as illustrated with arrow 607. In peer node 658 the search terms match to a knowledge object named "KOENINGSBERG". The knowledge objects "HISTORY", "PRUSSIA" and "KOENINGSBERG" are returned to peer node 650, as illustrated with arrow 608. Similarly, from the friends list is determined peer node 660 and a query is submitted to it as illustrated with arrow 609. In peer node 660 the knowledge database is traversed and a knowledge object "1ST DAY" is found which contains an alternative keyword with the name Kaliningrad. This keyword matches the query and therefore the knowledge objects "TRIPS", "TRAVEL", "DIARY", "RUSSIA", "1ST DAY" is returned to peer node 650 as illustrated with arrow 610.

Figure 7A:
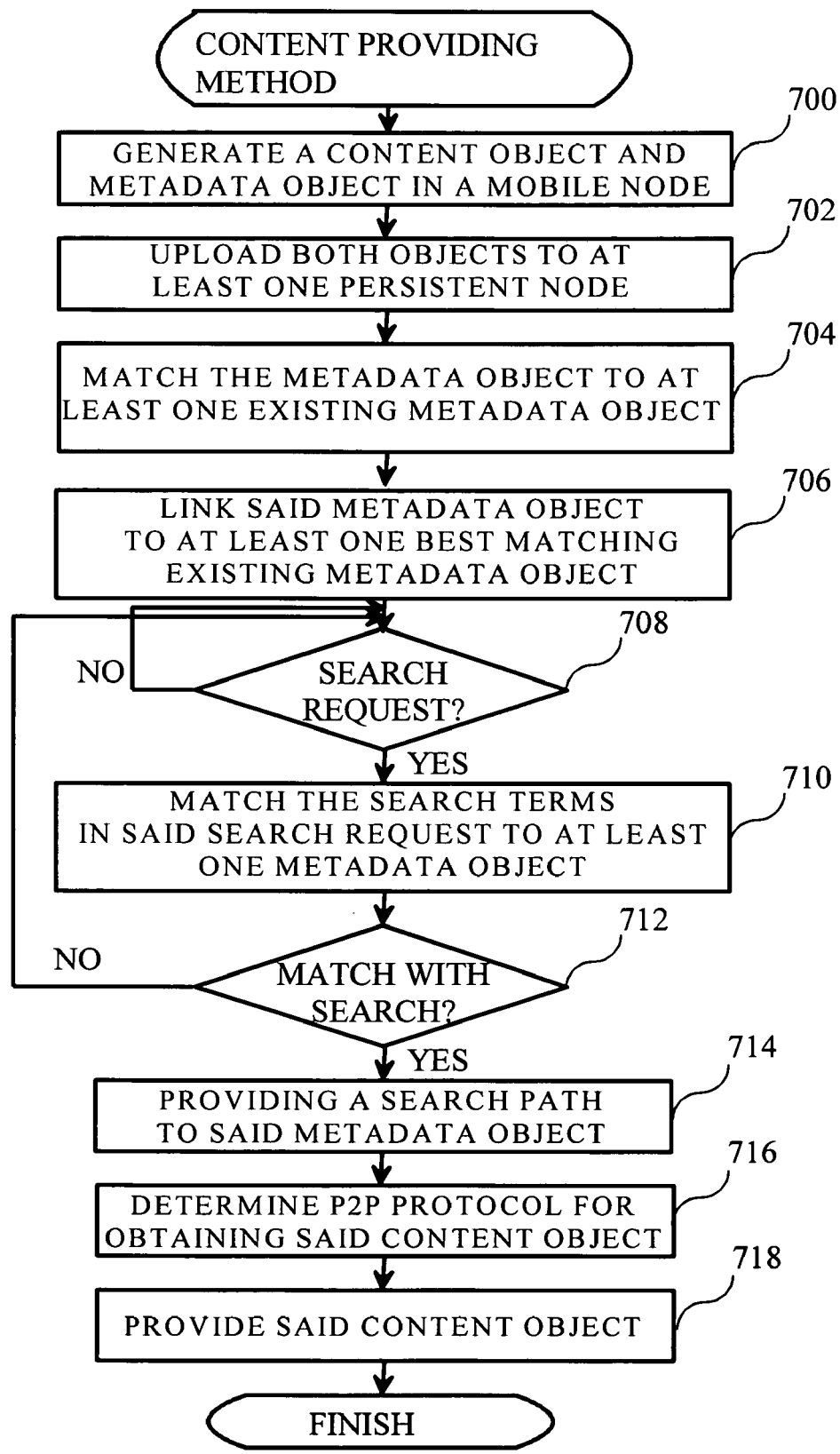
FIG. 7A is a flow chart illustrating a method for content providing in one embodiment of the invention.

FIG. 7A is a flow chart illustrating a method for content providing in one embodiment of the invention.

At step 700 a content object and a metadata object is generated in a mobile node. The content object may be a photo, a video, an audio recording or an arbitrary multimedia object. The metadata object may be automatically generated by mobile node in response to position information, time and date and other similar data. The metadata object may also have been manually defined by the user.

At step 702 mobile node up-loads both objects to at least one persistent node that is a peer node which is not served by a transient wireless connection.

At step 704 the metadata object is matched to at least one existing metadata object in the knowledge database. The matching may be based on keywords or a thematic relationship between keywords. The matching may also be based on an automatic classification between terms that is checked from an external classification system consulted by the peer node. The classification system is, for example, a hierarchy of keywords. The future position of the metadata object may also be directly specified by the user in terms of metadata object names that should be ancestors to the uploading metadata object.

At step 706 the metadata object is linked to at least one best matching existing metadata object. This entails, for example, that the uploaded metadata object is placed as a child node of a knowledge object determined at the earlier step. For example, a pointer or a database link is added to the parent node, which points to the uploaded metadata object.

At step 708 the peer node waits for a search request from a client node. In other words the search request is a query. If no search request is received the method continues at step 708.

At step 710 the search terms from the search request are matched to the metadata database.

At step 712 it is checked if there was a match. If there is no match an empty response is returned to the enquiring node and the method continues at step 708. If there is a match the method continues at step 714.

At step 714 a search path is provided to the metadata object for the enquiring node.

At step 716 the enquiring node deter-mines the correct peer-to-peer protocol for obtaining or accessing the content object from the peer node.

At step 718 the content object, or access to it, is provided from the peer node to the enquiring node. The providing may also involve other peer nodes which hold at least part of the content object.

Figure 7B:
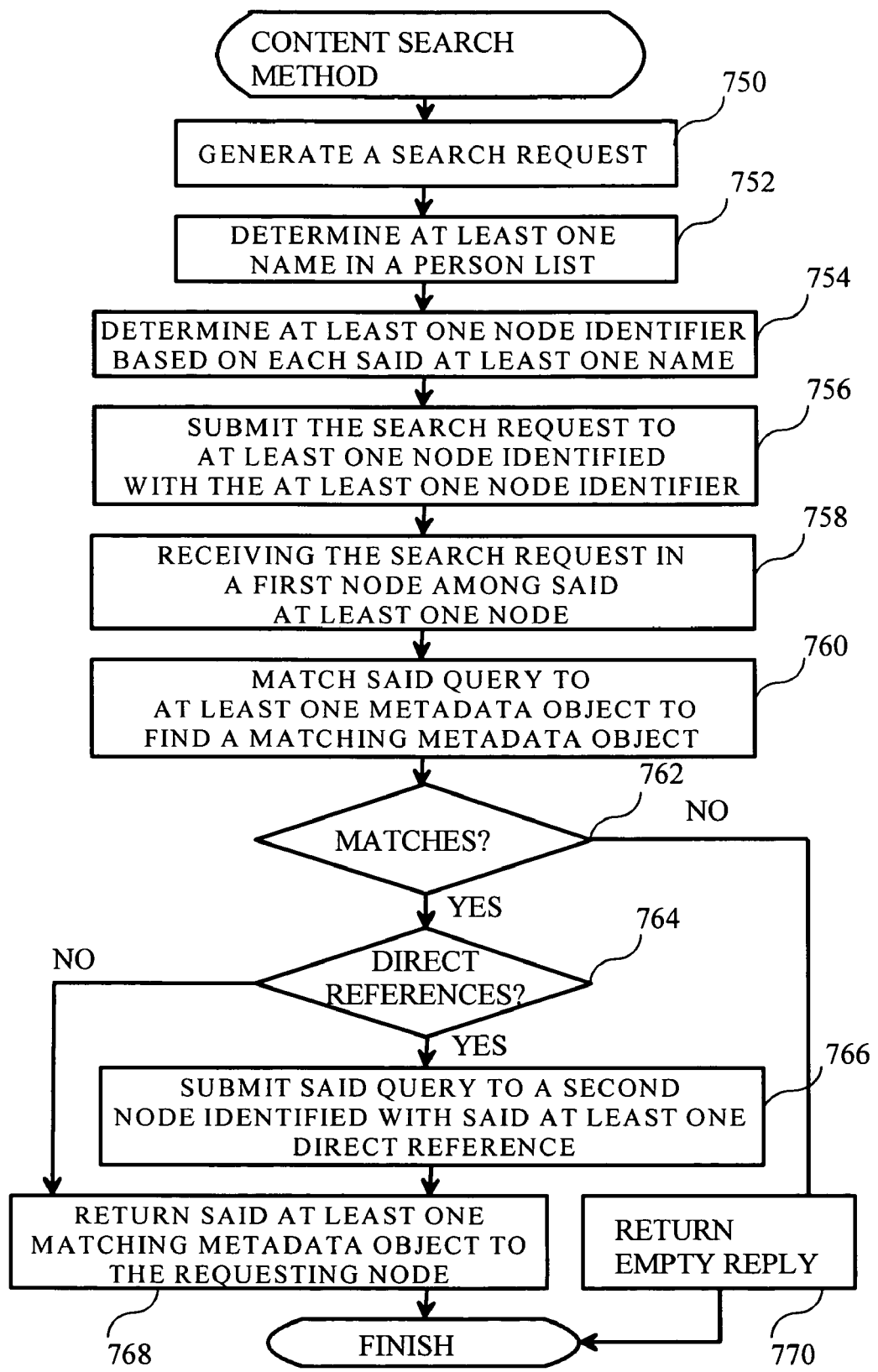
FIG. 7B is a flow chart illustrating a method for content searching in one embodiment of the invention.

FIG. 7B is a flow chart illustrating a method for content searching in one embodiment of the invention.

At step 750 a search request is generated in an enquiring node by a user.

At step 752 the Friends list of the user is checked to obtain at least one name.

At step 754 at least one node identifier is determined based on each name in the person list that is the Friends list. The node identifiers may be obtained for example using a distributed hash table or a directory. Thereupon the node identifiers are further resolved into IP addresses or other addressing means once again using for example a distributed hash table or the domain name system or another kind of directory.

At step 756 the search request is submitted to at least one node identified with the at least one node identifier. The search request is submitted by sending a message to the IP addresses or other addressing means obtained.

At step 758 the search request is received in a first node among said at least one node.

At step 760 the query is matched to at least one metadata object to find a matching metadata object. The matching is performed for example by traversing a tree structured knowledge database. If a query term matches for example the knowledge object name or key words. A match to the metadata object is detected.

At step 762 it is checked if there were any matches. If there were no matches the method continues at step 770 where an empty result is returned to the enquiring node. If there were matches the method continues at step 764 were it is determined whether any of the matched metadata objects contains a direct reference to another knowledge database. If there were no direct references the method continues at step 768. If there were direct references method continues at step 766.

At step 766 the query is submitted to a second node identified with the at least one direct reference. The second node then processes the query as if it was directly received from an enquiring user. The second node is also responsible for replying to the original enquiring node.

At step 768 the at least one matching meta-data object is returned to the enquiring node.

Figure 8:
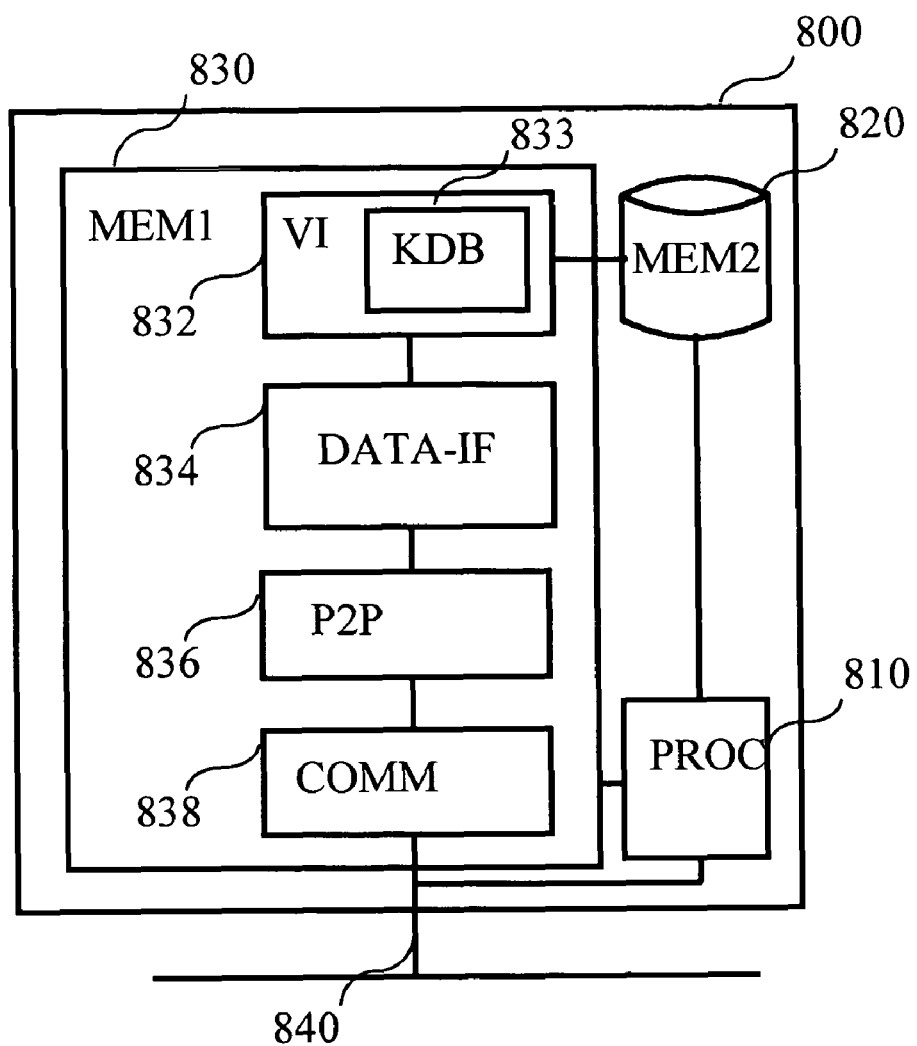
FIG. 8 is a block diagram illustrating a network node in one embodiment of the invention.

FIG. 8 is a block diagram illustrating a network node in one embodiment of the invention. In FIG. 8 there is a peer node 800. Peer node 800 comprises a processor 810 and a secondary memory 820. The secondary memory may be for example a hard disk or a flash memory, optic disk, holographic memory or other memory means known to persons skilled in the art. Peer node 800 comprises also a primary memory 830. When processor 810 is executing the peer node functionality primary memory 830 comprises a virtual instance 832, a data interface 834 and a peer-to-peer entity 836 and a communication entity 838. Communication entity comprises, for example, an IP protocol stack. Peer-to-peer entity 836 comprises for example a peer-to-peer protocol. Data interface entity 834 comprises software to access a database. Virtual instance entity 832 comprises a mirror of a knowledge database 833. Knowledge database 833 comprises a number of knowledge objects. Virtual instance entity 832 may also comprise a number of content items which are accessed using a peer-to-peer protocol. Peer node 800 also comprises a network interface 840 which may be for example a Local Area Network interface, Wireless Local Network inter-face or a Wide Area Network interface such as optic fire.

In one embodiment of the invention, communication entity 838 may comprise peer-to-peer entity 836 so that they together form a single communication entity.

The entities within network node 800 in FIG. 8, such as communication entity 838, peer-to-peer protocol entity 836, data interface 834 and virtual instance 832 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity. The entities in FIG. 8 may also be stored in separate memories and executed by separate processors, which communicate, for example, via a message bus or an internal network within the network node. An example of such a message bus is the Peripheral Component Interconnect (PCI) bus.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
    obtaining at least one search criterion in a first network node in a communication system;
    determining at least one entity entry from an entity contact information list, wherein said entity comprises at least one of a natural person or a legal person;
    determining an identity of a second network node in the communication system from said entity entry;
    determining an address for said second network node using said identity;
    causing said at least one search criterion to be submitted to said second network node;
    receiving at least a content object identifier from at least one result metadata object at said first network node, said at least one result metadata object being obtained in said second network node by matching said at least one search criterion to at least one metadata object;
    determining at least one direct reference associated with a metadata object, said direct reference identifying a third network node;
    causing said at least one search criterion to be submitted to said third network node;
    receiving, at said first network node, at least a content object identifier from at least one result metadata object in said third network node, said at least one result metadata object being obtained in said third network node by matching said at least one search criterion to at least one metadata object in said third network node; and
    obtaining or accessing a content object using a received content object identifier to said first network node.

2. The method according to claim 1, comprising obtaining said content object to said first network node from a fourth network node.

3. The method according to claim 1, wherein matching the at least one search criterion comprises traversing a tree structure comprising said at least one metadata object.

4. The method according to claim 1, the method further comprising:
    checking a predefined entity specific trust level before causing said at least one search criterion to be submitted to said second network node; and
    selecting a second entity entry from said entity contact information list in an instance in which said trust level is below a predefined threshold value.

5. The method according to claim 1, the method further comprising:
    receiving said at least one result metadata object and at least one metadata object on the path towards said at least one result metadata object at said first network node.

6. The method according to claim 1, wherein said metadata object comprises a structured document.

7. A method, comprising:
    obtaining a content object and a metadata object pertaining to said content object in a mobile node of a communication system;
    determining at least one associated metadata object for said metadata object;
    causing said content object to be uploaded from said mobile node to a second network node of the communication system;
    causing said metadata object to be uploaded from said mobile node to said second network node;
    determining at least one sharing node for said content object,
    causing at least a second part of said content object to be uploaded to said at least one sharing node;
    receiving a query from a first network node of the communication system;
    determining said metadata object as a result metadata object for said query in said second network node;
    causing at least a content object identifier for said content object from said metadata object to be provided to said first network node;
    causing at least a first part of said content object to be provided to said first network node from said second network node based at least in part upon said content object identifier; and
    enabling at least a second part of said content object to be provided to said first network node from said at least one sharing node based at least in part upon said content object identifier.

8. The method according to claim 7, wherein said causing said content object to be provided comprises causing said content object to be provided using a peer-to-peer protocol.

9. A communication system, comprising:
a first network node configured to obtain at least one search criterion, to determine at least one entity entry from an entity contact information list, to obtain an identity of a second network node from said entity entry, to obtain an address for said second network node using said identity, to submit said at least one search criterion to said second network node, to determine at least one direct reference associated with a metadata object, said direct reference identifying a third network node, to cause said at least one search criterion to be submitted to said third network node, to obtain at least a content object identifier and to obtain or access a content object with said content object identifier, wherein said entity comprises at least one of a natural person or a legal person;
said second network node configured to match said at least one search criterion to at least one metadata object to obtain at least one first result metadata object and to provide at least the content object identifier from said at least one first result metadata object to said first network node; and
said third network node configured to match said at least one search criterion to at least one metadata object to obtain at least one second result metadata object and to provide at least a second content object identifier from said at least one second result metadata object to said first network node.

10. The system according to claim 9, the system further comprising:
a fourth network node configured to provide said content object,
wherein
said first network node is configured to obtain said content object with said content object identifier from said fourth network node.

11. The system according to claim 9, wherein said second network node configured to traverse a tree structure comprising said at least one metadata object.

12. The system according to claim 9, wherein said first network node is configured to check a predefined entity specific trust level and to select a second entity entry from said entity contact information list in an instance in which said trust level is below a predefined threshold value.

13. The system according to claim 9, wherein said second network node is configured to provide said at least one result metadata object and at least one metadata object on a path towards said at least one result metadata object to said first network node.

14. The communication system according to claim 9, wherein said metadata object comprises a structured document.

15. A communication system, comprising:
a mobile node configured to obtain a content object and a metadata object pertaining to said content object, to determine at least one associated metadata object for said metadata object, to upload said content object to a second network node, and to upload said metadata object to said second network node;
said second network node configured to receive a query from a first network node, to determine said metadata object as a result metadata object for said query, to provide at least a content object identifier for said content object from said metadata object to said first network node, and to provide at least a second part of said content object to said at least one sharing node;
said first network node configured to download or access said content object using said content object identifier at least in part by determining at least one sharing node for said content object, downloading at least a first part of said content object from said second network node, and downloading at least a second part of said content object from said at least one sharing node; and
said at least one sharing node.

16. The communication system according to claim 15, wherein said first network node and said second network node are configured to apply a peer-to-peer protocol.

17. An apparatus, comprising at least one processor and at least one memory storing computer program code, wherein the at least one memory and stored computer program code are configured, with the at least one processor, to cause the apparatus to at least:
obtain at least one search criterion;
determine at least one entity entry from an entity contact information list, wherein said entity comprises at least one of a natural person or a legal person;
determine an identity of a second network node from said entity entry;
determine an address for said second network node using said identity;
cause said at least one search criterion to be transmitted to said second network node;
receive at least a content object identifier from at least one result metadata object, said at least one result metadata object being obtained in said second network node by matching said at least one search criterion to at least one metadata object;
determine at least one direct reference associated with a metadata object, said direct reference identifying a third network node;
causing said at least one search criterion to be submitted to said third network node;
receive at least a content object identifier from at least one result metadata object in said third network node, said at least one result metadata object being obtained in said third network node by matching said at least one search criterion to at least one metadata object in said third network node; and
obtain or access a content object with a received content object identifier from a remote network node.

18. An apparatus, comprising at least one processor and at least one memory storing computer program code, wherein the at least one memory and stored computer program code are configured, with the at least one processor, to cause the apparatus to at least:
cause storage of at least one metadata object and at least one content object, said at least one metadata object and at least one content object being stored based at least in part upon a determined at least one associated metadata object for said at least one metadata object;
determine at least one sharing node for said content object;
cause at least a second part of said content object to be uploaded to said at least one sharing node;
process a query from a remote network node;
determine a first metadata object among said at least one metadata object as a result metadata object for said query;
cause at least a content object identifier for a first content object among said at least one content object from said first metadata object to be provided to said remote network node;
cause at least a first part of said content object to be provided to said remote network node based at least in part upon said content object identifier; and enable at least a second part of said content object to be provided to said remote network node from said at least one sharing node based at least in part upon said content object identifier.

19. A computer program product comprising at least one computer readable medium having computer program code instructions stored thereon, wherein when the program code instructions are executed by a processor, the program code instructions are configured to cause an apparatus to perform:
 obtaining at least one search criterion;
 determining at least one entity entry from an entity contact information list, wherein said entity comprises at least one of a natural person or a legal person;
 determining an identity of a network node from said entity entry;
 determining an address for said network node using said identity;
 causing said at least one search criterion to be transmitted to said network node;
 receiving at least a content object identifier from said network node, said at least one result metadata object being obtained in said network node by matching said at least one search criterion to at least one metadata object;
 determining at least one direct reference associated with a metadata object, said direct reference identifying a second network node;
 causing said at least one search criterion to be submitted to said second network node;
 receiving at least a content object identifier from at least one result metadata object in said second network node, said at least one result metadata object being obtained in said second network node by matching said at least one search criterion to at least one metadata object in said second network node; and
 obtaining or accessing a content object with a received content object identifier.

20. The computer program product according to claim 19, wherein at least one of said at least one computer readable medium comprises a removable memory card.

21. The computer program product according to claim 19, wherein at least one of said at least one computer readable medium comprises a magnetic or an optical disk or a holographic memory.

22. A computer program product comprising at least one computer readable medium having computer program code instructions stored thereon, wherein when the program code instructions are executed by a processor, the program code instructions are configured to cause an apparatus to perform:
 causing storage of at least one metadata object and at least one content object, said at least one metadata object and at least one content object being stored based at least in part upon a determined at least one associated metadata object for said at least one metadata object;
 determining at least one sharing node for said content object;
 causing at least a second part of said content object to be uploaded to said at least one sharing node;
 processing a query from a remote network node;
 determining a first metadata object among said at least one metadata object as a result metadata object for said query;
 causing at least a content object identifier for a first content object among said at least one content object from said first metadata object to be provided to said remote network node;
 causing at least a first part of said content object to be provided to said remote network node from said second network node based at least in part upon said content object identifier; and
 enabling at least a second part of said content object to be provided to said remote network node from said at least one sharing node based at least in part upon said content object identifier.

23. The computer program product according to claim 22, wherein at least one of said at least one computer readable medium comprises a removable memory card.

24. The computer program product according to claim 22, wherein at least one of said at least one computer readable medium comprises a magnetic or an optical disk or a holographic memory.

* * * * *